Jan. 20, 1942. W. S. HALL, JR 2,270,294
INDICATING APPARATUS
Filed April 14, 1939
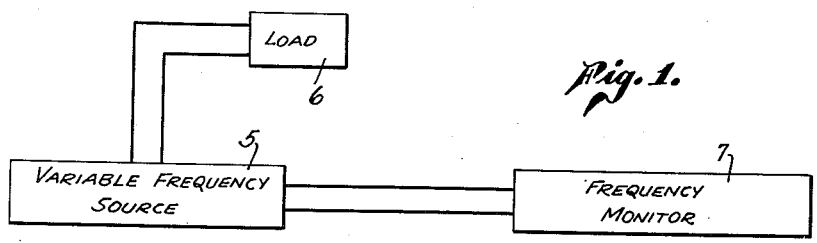
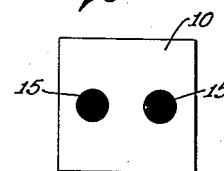 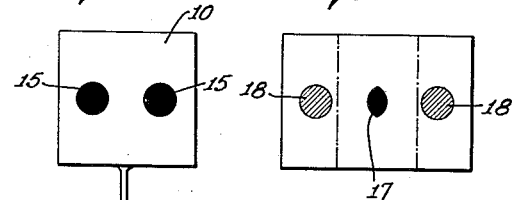 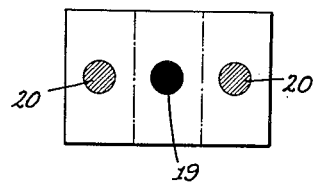
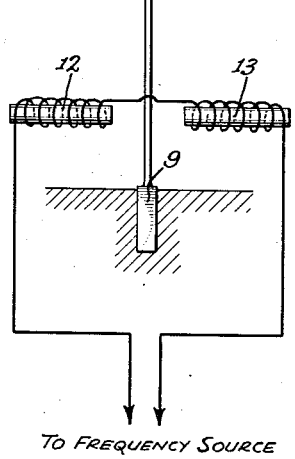
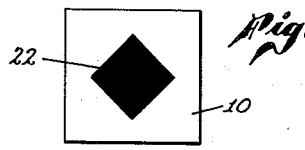
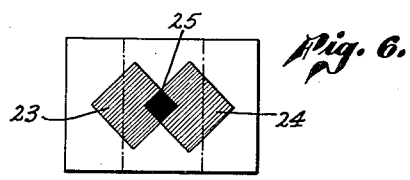
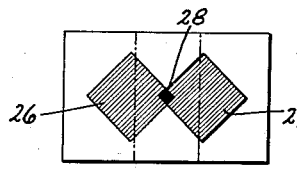
Inventor
WALTER SCOTT HALL JR.,
By
Attorney Patented Jan. 20, 1942

2,270,294

UNITED STATES PATENT OFFICE 2,270,294

INDICATING APPARATUS

Walter Scott Hall, Jr., Los Angeles, Calif., assignor to Radio Corporation of America, a corporation of Delaware Application April 14, 1939, Serial No. 267,766

4 Claims. (Cl. 88—14)

This invention relates to measuring devices and particularly to the indicating portion of a measuring device wherein the response is indicated by a moving member such as a reed.

Frequency meters are well known, such meters employing a vibratory member such as a slender shaft, a portion of which is metallic and upon which is mounted an enlarged observation surface, the shaft being positioned adjacent a magnetic field produced by the frequency to be measured. Certain devices of this type employ a group of reeds adapted to vibrate when actuated by certain frequencies which are impressed on all the reeds, while others employ a single reed which indicates a certain frequency when such a frequency is impressed on the magnetic field producing coil adjacent the reed.

It has been found in the use of such devices that the point of maximum vibration and difference in amplitude of vibration are difficult to determine, since the viewing area or the edges of the area become indistinct and blurry.

An object of the present invention, therefore, is to facilitate measurements with a frequency measuring device.

Another object of the invention is to improve the readability of the vibrating element of a measuring device.

A further object of the invention is to distinguish a vibrating element by fixed definite primary patterns which produce secondary patterns upon vibration, the shape and size of the secondary patterns depending upon the amplitude of vibration of the element.

Although the novel features which are believed to be characteristic of this invention are pointed out with particularity in the claims appended hereto, the manner of its organization and the mode of its operation will be better understood by referring to the following description read in conjunction with the accompanying drawing forming a part thereof, in which Figure 1 is a block diagram showing the general application of the invention;

Figure 2 is a diagrammatic view of the essential elements of a single reed frequency meter embodying the invention;

Figure 3 is the appearance of the observation portion of the reed of Figure 2 at one amplitude of vibration;

Figure 4 shows the appearance of the same portion of the reed of Figure 2 at another amplitude of vibration thereof;

Figure 5 shows another type of reed marking;

Figure 6 shows the appearance of the reed of Figure 5 at one certain amplitude of vibration; and Figure 7 shows the appearance of the reed of Fig. 5 at a greater amplitude of vibration than that shown in Figure 6.

Referring now to Fig. 1, a type of variable frequency source 5 is shown supplying a load 6. If the frequency of the power supplied by source 5 is important, it is generally monitored in some manner such as by providing a frequency monitor 7 either of the multiple reed type or of the single reed type. In Fig. 2, the essential elements of a single reed vibrator are illustrated, this device consisting of a thin, metallic shaft portion 8 fixedly mounted as at 9 with a thin, flat observation surface portion 10. The reed may be activated magnetically in different manners, the one illustrated including a pair of solenoids 12 and 13, the windings of which may be connected to the frequency source. The reed 8—10 has a certain natural period of vibration which is to be indicated therewith, and when this vibration or frequency is impressed on the solenoids 12 and 13, the reed will vibrate in the plane of the paper, the maximum amplitude being obtained when the exact resonant frequency of the reed is impressed on the solenoids at a certain maximum intensity.

Vibration of the flat surface 10 in the plane of the paper is of course discernible although the outlines of the portion 10 become hazy with its movement, and it thus becomes particularly difficult to distinguish differences in the amplitudes of vibration and the point of maximum vibration of the reed. According to this invention, therefore, the surface 10 is provided as shown in Fig. 2 with two black dots or solid circles 15 on a white background of the surface 10. These dots may also be of colors different from the background to produce as great a contrast as possible therebetween. Now, upon sufficient vibration of the reed, the dots 15 form a third figure, the shape and size of which is dependent upon the amplitude of the vibration. The result of one amplitude of vibration is shown in Fig. 3, the dots 15 forming the Figure 17 in the center of the region of vibration, this figure appearing elliptical or oval for the particular degree of vibration shown. The two dots 15 now shown at 18 retain their original shape and appear at the edges of the reed in a lighter intensity. When the reed reaches maximum vibration, as shown in Fig. 4, the center dot 19 becomes of the shape of the original dots 15 and of substantially the same intensity, while the outer dots 20 are somewhat lighter in intensity than dots 18. The central figure thus varies in size and shape in accordance with the amplitude of vibration of the reed.

Therefore, with a marking such as shown in Fig. 2, the maximum and intermediate degrees of vibration of the surface 10 are readily distinguishable at a glance and more accuracy is thus obtained with a frequency monitor so marked. It will be noted that the observer's eye need only watch an apparently fixed spot to determine the various amplitudes of vibration of the reed instead of moving blurry edges. Should each of the dots 15 be of a different color, then the composite dot 17 and 19 may become a third color different from either and, thus, easily distinguishable therefrom.

Referring now to Figs. 5, 6 and 7, the marking on the surface 10 comprises a diamond-shaped black area 22 on a white background. The diamond 22 may also be of a color which contrasts well with the background. In Fig. 6, an intermediate degree of vibration is shown wherein the diamond 22 appears as two lighter diamonds 23 and 24 with a dark diamond area 25 produced by the overlap of the two lighter diamonds 23 and 24. In Fig. 7, a certain maximum point of vibration is shown with the two diamonds 26 and 27 forming a small opaque diamond 28. Thus, in Figs. 5, 6 and 7, increases in vibration are indicated by decreases in the generated area, while in Figs. 2, 3 and 4, increases in vibration are indicated by increases in the generated figure.

It is to be realized, of course, that other various shapes and sizes of figures are usable, as taught by the present invention, either by the use of two spaced markings of different shapes or colors or a single marking of a suitable shape and color contrastable with its background surface. It has been found in actual use that the above reed markings increase the accuracy of reading the various amplitudes of the vibrating surface 10 and increase the speed of making the reading.

I claim as my invention:

1. A vibration indicator comprising a vibratory reed and a flag mounted on said reed, said flag having a flat surface adapted to be vibrated in the plane of said surface, said surface having a marking thereon contrasting with said surface and of a shape such that the dimensions thereof in directions at right angles to each other are substantially equal, said marking being positioned on said surface so that its longest dimension is parallel to the direction of vibration of said surface.

2. A vibration indicator in accordance with claim 1 in which said marking is substantially square-shaped and positioned on said surface with a diagonal parallel to the direction of motion of said surface.

3. A vibration indicator comprising a vibratory reed and a flag mounted on said reed, said flag having a flat surface adapted to be vibrated in the plane of said surface, and a marking on said surface, said marking contrasting with a certain degree of intensity with the remainder of said surface when said surface is stationary, and contrasting in a lesser degree when said surface is vibrated, said vibration creating a secondary figure contrasting with said surface with substantially the original degree of intensity between said marking and surface when said surface is stationary.

4. A vibration indicator in accordance with claim 3 in which said marking is of substantially equal dimensions in directions at right angles to each other.

WALTER SCOTT HALL, Jr